US006697836B1

United States Patent
Kawano et al.

(10) Patent No.: US 6,697,836 B1
(45) Date of Patent: Feb. 24, 2004

(54) METHOD AND APPARATUS FOR CONTROLLING SERVER

(75) Inventors: Shigeki Kawano, Yokosuka (JP); Junichi Toyouchi, Sagamihara (JP); Motohisa Funabashi, Machida (JP); Masanori Kataoka, Yokohama (JP); Katsumi Kawano, Kawasaki (JP); Linda Strick, Berlin (DE)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/153,873

(22) Filed: Sep. 16, 1998

(30) Foreign Application Priority Data

Sep. 19, 1997 (JP) .............................. 9-254661

(51) Int. Cl.[7] .............................................. G06F 15/16
(52) U.S. Cl. ...................... 709/202; 709/219; 709/249
(58) Field of Search ................................ 709/202, 203, 709/217, 218, 219, 244, 249, 226, 227, 201, 229; 713/200, 201

(56) References Cited

U.S. PATENT DOCUMENTS

| 5,329,619 A | * | 7/1994 | Pagé et al. ................. 709/203 |
| 5,341,477 A | * | 8/1994 | Pitkin et al. ................ 709/226 |
| 5,459,837 A | * | 10/1995 | Caccavale .................... 709/226 |
| 5,475,819 A | * | 12/1995 | Miller et al. ................. 709/203 |
| 5,544,320 A | * | 8/1996 | Konrad ........................ 709/203 |
| 5,717,923 A | * | 2/1998 | Dedrick ....................... 707/102 |
| 5,835,727 A | * | 11/1998 | Wong et al. ................. 709/238 |
| 5,838,970 A | * | 11/1998 | Thomas ....................... 709/316 |
| 5,898,830 A | * | 4/1999 | Wesinger, Jr. et al. ...... 709/227 |
| 5,956,489 A | * | 9/1999 | San Andres et al. ........ 709/221 |
| 6,003,084 A | * | 12/1999 | Green et al. ................. 709/227 |
| 6,006,264 A | * | 12/1999 | Colby et al. ................. 709/226 |
| 6,044,402 A | * | 3/2000 | Jacobson et al. ........... 709/225 |
| 6,173,311 B1 | * | 1/2001 | Hassett et al. .............. 709/202 |
| 6,314,089 B1 | * | 11/2001 | Szlam et al. ................ 709/238 |

* cited by examiner

Primary Examiner—Marc D. Thompson
(74) Attorney, Agent, or Firm—Antonelli, Terry, Stout & Kraus, LLP (57) ABSTRACT

A client (referred to as A) transmits a request to a service mediate server (referred to as B) through a communication medium. B receives information. A server (referred to as C) receives a request for obtaining information from B and transmits information requested by B. B receives a request from A. A service mediate managing unit determines a type of information to be provided to A, based on the attribute information of the content of the request, the customized information of A and C pre-stored in the service mediate managing unit, and various status at the receipt of the request. The service mediate agent selects any one of plural Cs and transmit the request for obtaining information to the selected C. The information received by C is processed by the service mediate agent and the processed information is transmitted to A.

1 Claim, 9 Drawing Sheets

FIG.2

104A
SERVICE PROVIDING SERVER SELECT POLICY

| |
|---|
| METHOD FOR NARROWING SERVERS = BATCH MATCHING<br>PRIORITY CONDITION = MINIMIZING SERVICE COST<br>COPING WITH SERVER FAULT = SELECTION OF ANOTHER<br>SERVER |
| METHOD FOR NARROWING SERVERS = STEPWISE MATCHING<br>PRIORITY CONDITION = MINIMIZING DISTANCE BETWEEN<br>CLIENT AND SERVER |
| ⋮ |
| |

1041 SERVICE MADIATE POLICY TABLE

FIG.3

| 1051A<br>SERVICE<br>REQUESTER<br>ID | 1051B<br>SERVICE REQUESTER<br>INFORMATION | 1051C<br>SERVICE REQUEST CLIENT<br>TERMINAL INFORMATION |
|---|---|---|
| 101 | REQUESTER NAME =<br>KOUNO, HIDEKI<br>SEX = MALE, AGE = 29<br>BELONGING = 101, LEVEL = D | ADDRESS = 133. 144. 8. 20<br>INSTALLING PLACE = SECOND<br>ÔZENJI BUILDING, 1F<br>COMMUICATIONS PROTOCOL = WWW |
| 102 | REQUESTER NAME =<br>TOYOUCHI, JUNICHI<br>SEX = MALE, BIRTH DATA = 18/07/61<br>NATIONALITY = JAPANESE | PHONE NUMBER = 010-123-4567,<br>COMMUNICATIONS SYSTEM = $\alpha$-DATA32<br>MEMORY CAPACITY = 1MB |
| ⋮ | ⋮ | ⋮ |
| | | |

CLIENT ID TABLE 1051

FIG.4

| 1061A<br>SERVICE<br>TYPE | 1061B<br>SERVICE<br>PROVIDING<br>SERVER<br>ADDRESS | 1061C<br>SERVICE PROVIDING<br>CONDITION | 1061D<br>SERVICE<br>INTERFACE |
|---|---|---|---|
| DEPOSIT | 133.144.8.10 | CHARGE = 0 YEN<br>PROVIDING TIME = 12:00<br>~12:00 | DEPOSIT (ACCOUNT NUMBER,<br>RECEIVED AMOUNT,<br>DATE AND TIME,<br>ATM NUMBER) |
| DEPOSIT | 181.9.191.8 | CHARGE = 0 YEN<br>PROVIDING TIME = 8:50<br>~18:00 | DEPOSIT (DATE AND TIME,<br>RECEIVED TIME, ATM NUMBER,<br>ACCOUNT NUMBER,<br>ACCOUNT TYPE,) |
| PAID | 133.144.8.10 | CHARGE = 105 YEN<br>PROVIDING TIME = 9:00<br>~17:00 | PAID (DATE AND TIME,<br>ACCOUNT NUMBER,<br>ACCOUNT NUMBER OF PAYEE,<br>AMOUNT, ATM NUMBER) |
| ⋮ | ⋮ | ⋮ | ⋮ |
|  |  |  |  |

PROVIDING SERVICE TABLE 1061

FIG.5

PROVIDING SERVICE REGISTRATION FORMAT

| SERVICE<br>PROVIDING<br>SERVER ID | SERVICE<br>TYPE | SERVICE<br>PROVIDING<br>CONDITION | SERVICE<br>INTERFACE | ~470 |
|---|---|---|---|---|
| 461 | 462 | 463 | 464 | |

FIG.6

SERVICE REQUEST MESSAGE FORMAT

| SERVICE<br>REQUESTER ID | SERVICE<br>REQUEST<br>CONDITION | DATA UNIT | ~480 |
|---|---|---|---|
| 481 | 482 | 483 | |

METHOD AND APPARATUS FOR CONTROLLING SERVER

CROSS-REFERENCE TO RELATED APPLICATIONS

The present invention concerns with the U.S. patent application Ser. No. 08/776,717 filed on Jan. 29, 1997 by Junichi Toyouchi, et al., with a title of "Service Providing System", the disclosure of which is incorporated herein by reference.

BACKGROUND OF THE INVENTION

1. Field of the Invention

The present invention relates to a service providing system which provides information service to computers for obtaining information over a wide area.

2. Description of the Related Art

In recent days, because of spread of networking techniques such as an internet work and personal computer communications and expansion of businesses through networks, wide information services to be utilized by the end users who need to use those services have surprisingly increased.

However, an interface such as World Wide Web currently provided by the internet technique requires each end user to obtain an information providing computer as a connecting destination. At a time, the interface cannot be connected to two or more information providing computers. Hence, each end user has difficulty in finding a truly necessary service from an information ocean containing a massive amount of information and in making efficient use of it without obtaining prerequisite knowledge and taking time.

Where an end user connects his or her computer to an information providing computer through the personal computer communications, the personal computer communications system merely provides a communication path to the information providing computer or leases its database to an information provider. Each end user has to be connected to a system of a destination information provider for sequentially retrieving a service content and applying for admission to a desirous service of the system.

Further, some techniques such as CORBA and DCOM have been proposed for implementing a unified communication interface and protocol on various existing platforms and thereby enhancing the mutual connectivity among those platforms. Like the WWW, those techniques require the user to grasp such a technique until the user reaches some platform. The user who cannot grasp it cannot find the most approximate service. The CORBA employs a technique referred to as "Trading Service" which tries to find out the most approximate platform based on the condition of use inputted by the user. All the end users for this Trading Service are required to grasp the condition of use. The end users cannot dynamically change the condition according to the status of the service provision and input the providing condition on the service providing side. A technique referred to as TINA has been proposed. This TINA is used for standardizing the techniques for processing communication connections among the users in the field of communications based on the technique of CORBA. This technique needs each end user to grasp a destination to be connected with the end user by using the similar technique to Trading referred to as "Broker". Hence, this technique also has the same problem as CORBA.

The prior information service provides a stationary content and thus supplies the same service in response to the same request irrespective of the end user or the status of the system appearing when the service is required.

SUMMARY OF THE INVENTION

It is an object of the present invention to provide a mediator and a mediating method through which even a client who does not know an address of a server for providing a service can obtain a target service.

It is a further object of the present invention to provide a method and an apparatus for evaluating a favor and a using history of each end user, selecting a service of an information providing computer for meeting the evaluated result, and supplying the selected service. The method and apparatus preferably make it possible to change a service to be provided by the end user if a new addition or a change of a service of the information providing computer takes place, change the providing service as evaluating an environment and quality of service/information of the system, and deputize some works such as application for admission to use of the service for an information providing computer when the services of plural information providing computers are received in an integrated manner, arrangement among the services, and payment of a service cost to an information provider.

In carrying out the foregoing objects in a preferred mode, according to an aspect of the invention, there is provided a mediating device connecting to a plurality of servers and clients through a network, for mediating data communications between said servers and clients, comprising:

a storage unit for storing a given condition between said server and client;

a mediate agent for comparing a request for a service received by said client with said given condition stored in said storage unit and determining a destination server to which said request is to be transmitted, based on said compared result; and a communications managing unit connecting to said mediate agent and for transmitting said request to said determined server. It is possible to make the mediating device wherein said mediate agent compares said request for said service received from said client with each type of services stored in said storage unit and determine what type of service is to be transmitted as a request, or compares a time condition provided by said server with said request and determines a destination server to which said request is to be transmitted.

Further, it is possible to make the device include a second storage unit for storing a type of a service provided by another server connected to another mediating device connecting to said network; and wherein said communications managing unit compares said request with said type of said service provided by said another service. In another aspect of the invention, a service providing system having plural devices for obtaining information and plural devices for providing information connected through a network is configured to have at least one device mediated between the devices for obtaining information and the devices for providing information, the mediated device serving to control receipt of contents requested by the devices for obtaining information, transmission of a request for providing information to at least one of the devices for providing information, obtention of the requested information, and distribution of the information to the devices for obtaining information.

Instead, the mediated device may be arranged to control the process of receiving and storing attribute information provided by at least one of the devices for providing information, retrieving at least one of the devices for providing information based on at least one of the attribute information, a type information concerned with the device for obtaining information, and a content requested by the device for obtaining information.

Instead, the mediating device may be arranged to control the process of receiving and storing the retrieval policy information provided by at least one of the devices for providing information, retrieving at least one of the devices for providing information based on the retrieval policy information, for distributing the information to the retrieved device.

Further, plural networks having plural devices for obtaining information and plural devices for providing information connected therewith may have a network for connecting those networks, a gateway unit for connecting those networks, at least one device mediated between the devices for obtaining information and the devices for providing information and located in each of those networks, and the mediated devices serving to control the process of sharing the content requested by the devices for obtaining information located in each network, retrieving plural devices for providing information in concert, and distributing information from those devices in concert.

Further, the mediated device may be arranged to control the process of receiving and storing attribute information provided by at least one of the devices for providing information, sharing the attribute information with another mediated device located in another network, retrieving at least one of the devices for providing information in concert with another mediated device located in another network, based on at least one of the attribute information, type information concerned with the device for obtaining information, and a content requested by the device for obtaining information, and distributing information to the device for obtaining information.

Moreover, a mediating process is located between at least one of plural devices for obtaining information and at least one of plural devices for providing information. The mediated device may be arranged to control the process of receiving contents requested by the devices for obtaining information, sharing the requested contents in the mediating process located in at least one device, transmitting a request for providing information to at least one of the devices for providing information based on the contents, obtaining the requested information, and distributing information to the devices for obtaining information.

Further, the mediated device is made up of a communications managing unit, a service mediate managing unit, and at least one service mediating agent. The communications managing unit operates to receive the content requested by the device for obtaining information, register attribute information provided by the device for providing information, and managing the communication process provided in the case of providing information. The service mediate managing unit operates to retrieve the device for providing information based on at least one of type information concerned with the device for obtaining information, attribute information concerned with the device for providing information, and mediate policy information for retrieving the device for providing information. The service mediate agent operates to select and start the application programs in the devices for providing information to be retrieved, pass a proper value to the application programs, and obtain the contents of the information provided by the application programs, for the purpose of controlling the distribution of the information to the devices for obtaining information.

Further, the mediated device is made up of a communications managing unit, a service mediate managing unit, and at least one service mediate agent. The service mediate managing unit operates to share the type information concerned with the device for obtaining information, the attribute information concerned with the device for providing information, and mediate policy information for retrieving the device for providing information with another mediated device located in another network. Then, the service mediate managing unit operates to retrieve the device for providing information in concert with another mediated device based on at least one of those pieces of informations. The service mediate agent operates to select and start application programs running in the devices for providing information to be retrieved, pass a proper value to the application programs, obtain the contents of the information provided by the application programs, integrate the contents of the information provided by the application programs with each other, for the purpose of controlling the process of distributing the information.

DESCRIPTION OF THE PREFERRED EMBODIMENT

Figure 1:
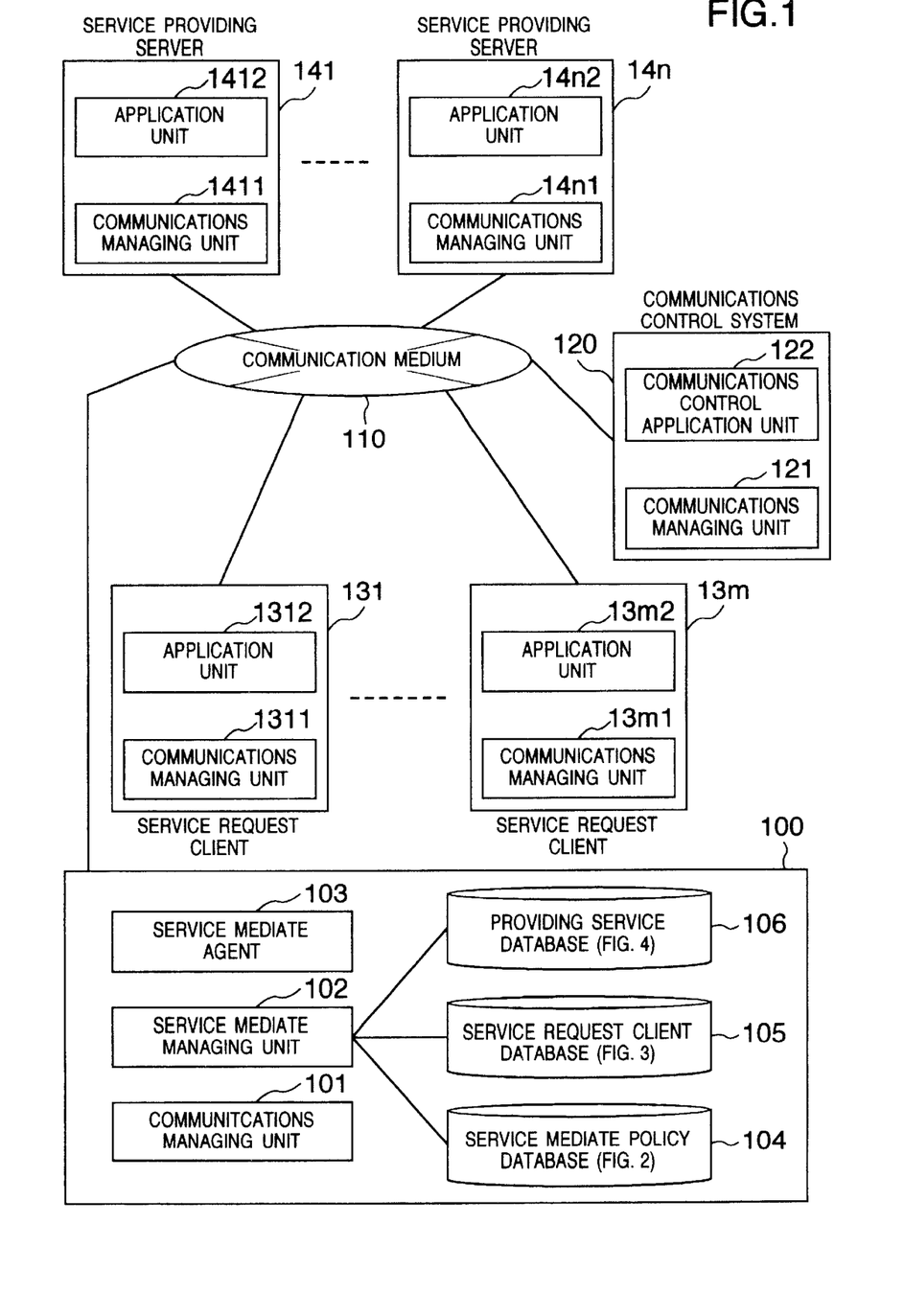
FIG. 1 is a diagram showing a system configuration according to a first embodiment of the present invention.

The system configuration according to the first embodiment of the invention is illustrated in FIG. 1.

The present system configuration is configured to have four kinds of terminals containing service providing servers 141 to 14n, service request clients 131 to 13m, a service mediate server 100, a communications control system, those four of which are connected to various kinds of communication mediums 110 containing a wide area network. Herein, this communication medium may be any medium including Ethernet, ATM, frame relay, and control network.

The servers 141 to 14n notify the system of the service information for the purpose of providing a desirous service to an end user. The user of the providing server may be an enterprise or an individual who holds and promotes the service. The actual service content indicates information for managing persons, objects and money to be transferred between a user of the server and an end user through the information service, such as information service like electronic shopping, a reservation of a physical distribution service like move-housing, a request for placing an order of a good, repair, and arrangement of temporaries. This server 141 includes a communications managing unit 1411 for doing communications with the communication medium 110 and an application unit 1412 for executing and managing a service providing process for the purpose of the actual users. This server 141 may be a database server, a WWW server, an FTP server, a WAIS server, a Gopher server or the like.

The clients 131 to 13m may be used directly by an end user who uses the foregoing service or sharably by plural end users. The clients 131 to 13m operate to transmit a request to a service mediate server 100 through the communication medium 110 and receive information from the server 141. The clients 131 to 13m may be leased terminals, personal computers, workstations, multimedia kiosks, personal digital assistances (PDA) or the like.

The client is made up of communications managing units 1311 to 13m1 for managing a communication process through the communication medium 110 and application units 1312 to 13m2 for managing user interfaces or the like to be requested by the end user and provided to the end user. The service mediate server 100 operates to retrieve a place and a type of a service to be exchanged between the servers 141 to 14n and the clients 131 to 13m and perform the mediating process such as a control for providing the retrieved place and type. In actual, the server may be a personal computer, a workstation, a general computer or the like, as an example. The service mediate server 100 whose destination is specified by a client operates to receive a request given by the client 131 and determine the type of information to be provided to the client 131, based on the condition information of the request, the client pre-stored inside of the server 141, the personal information and the past history information of the user of the server, and various statuses given in receiving the request. The server does not receive the request unless it contains an address specified by a client.

The service mediate server 100 for doing a mediating process between the client and the server operates to transmit a request for trying to obtain information to the server that can obtain the information of the necessary type, selected from the servers 141 to 14n. Herein, the service mediate server 100 operates to determine the information to be provided to the client 131 on the basis of the information received by the servers 141 to 14n and the information owned by the server 100 itself and transmit the service request for obtaining the information to the servers 141 to 14n.

In the foregoing process, where the services provided from two or more servers are distributed to a client for requesting the services, the service mediate server operates to arrange these services and process them in synchronous. The provision of the services from the servers is executed according to the request for the end user and the status thereof. At a time, the synchronous process includes a process of integrating plural services, a process of making a reservation so that the target service may be provided at a specified time, a process of arranging the request from plural clients, a process of providing a service to a specified client, and so forth.

The service mediate server 100 includes the following three components. Concretely, the server 100 is made up of a communications managing unit for doing communications in connection with the communication medium 110, a service mediate managing unit for retrieving a server to optimally match to a request condition of the client 131 and a service type and managing a database containing management information required for the retrieval, and a service mediate agent for controlling and managing a process from the retrieved service providing server to the client. The service mediate server 100 holds three kinds of databases.

Figure 2:
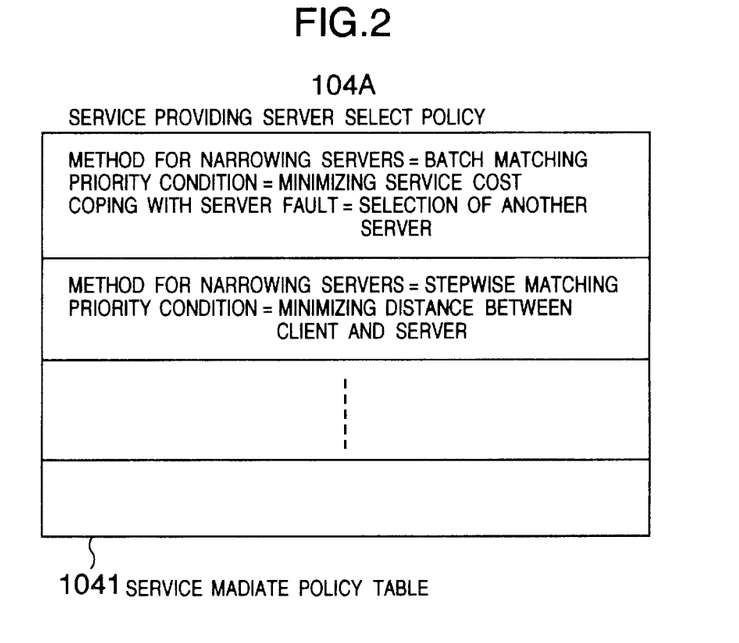
FIG. 2 is a view showing an example of a service mediate policy table.

The service mediate policy database 104 holds condition information for retrieving the most approximate server to the condition requested by the client and the service type to be provided to the client. An example of a service mediate policy database is illustrated in FIG. 2. At each one server select policy 104A, information is saved. Herein, the space for saving an information item and a select policy to be given at each select policy is made to have a structure to be expanded dynamically, that is, without stopping the advance of the process. For example, it is considered that the table may be arranged so that each information is managed as one table, in which a column describes each type select policy and each item information is connected in a list structure.

The example of the data actually stored in the service mediate policy table is illustrated in FIG. 2. The information items shown in FIG. 2 are "Method for Narrowing Servers", "Priority Condition", and "Coping with Server Fault". At each select policy, the information items are uniquely managed with an individual policy ID at the service mediate policy table. The content of each information item at each select policy indicated by 1041 have the following three.

The "Method for Narrowing Servers" at a certain policy makes use of a batch matching, that is, a retrieval policy of retrieving all the conditions specified by a client in the mediate server for finding out the matching server. The "Method for Narrowing Servers" at another policy is stepwisely executed to enter the conditions inside of the mediate server 100 and execute the retrieval process within the inside of the management unit 102 shown in FIG. 1, and inquire of the client about the server and the service outputted as the retrieved result at each step.

As an exemplary policy, where two or more service providing servers operate to output their informations, the kind of priority condition under which the service providing server is selected is specified in the "Priority Condition". Herein, this policy is executed to specify the retrieval of the server whose cost taken in the service can be minimized and specify the retrieval of the server in the condition that the distance or the distance data between the service requesting client and the service providing server is minimized.

At a certain policy of "Coping with Server Fault", it is possible to specify if another server is selected or the server retrieval is terminated in the condition. In order to allow this service mediate policy table 1041 to be used, it is necessary to employ the structure wherein the foregoing retrieval process and the process for additionally specifying the data required for the retrieval are executed with respect to the retrieval process commonly held in the service mediate server 100. As one implementation, it is possible to employ the retrieval process based on the rule base. The retrieval rules are a technique for doing the retrieval on the condition data according to a constant format called the rules.

The registration of the content of each service providing server select policy 104A may be defined by an administrator of the service mediate server 100 or a user of the server 141. When the client 131 issues a request for a service, the service mediate managing unit 102 executes the retrieval process, when the select policy to be used is selected by the following method. One is the method of specifying the select policy from the client. This method requires the select policy to be explicitly shown to the service selecting condition to be specified by the client. The other is the method of describing the select policy to be used at each client unless specified in the condition information of the database 105 by the client because the condition information for each client is managed by the service mediate managing unit. In this method, the condition information is treated as the individual information of each client. The service request client table 105 for saving the client individual information takes a structure wherein the content of the condition information may be dynamically changed. Hence, the select policy information to be registered as part of the individual information may be dynamically changed.

Figure 3:
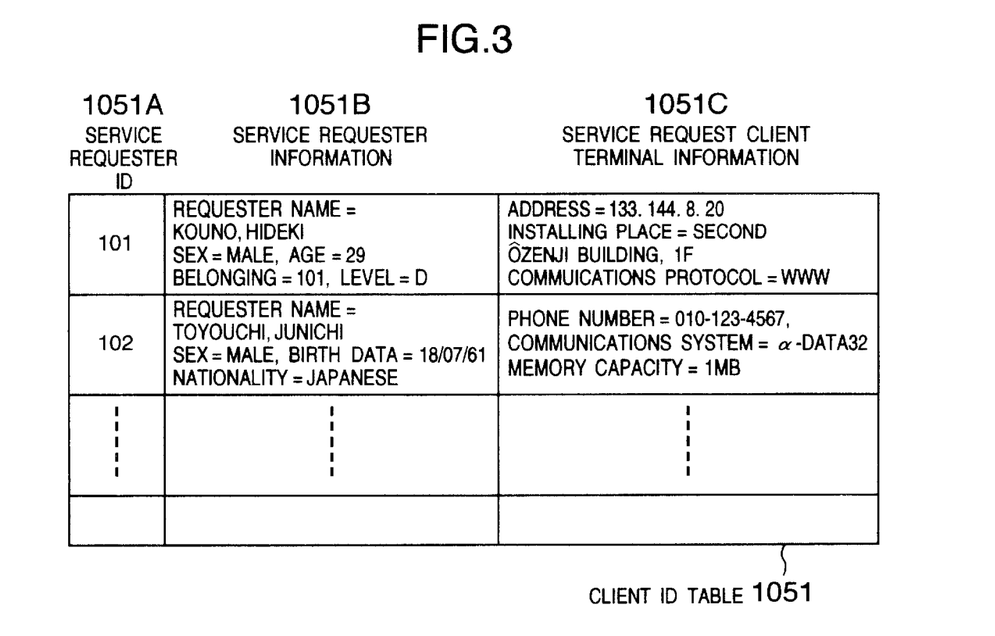
FIG. 3 is a view showing an example of a client table.

FIG. 3 shows the structure of the client ID table 105. The client ID table 1051 operates to manage the individual information about each client inputted by the user. In actual, a service requester who corresponds to the end user is made up of a service requester ID 1051A with which the service mediate server can uniquely identify the service requester, service requester information 1051B that is information customized for each service requester, and service request client terminal information 1051C for saving attribute information about a service request client terminal.

Preferably, the structure of the table 1051 may be dynamically changed. That is, the information item to be registered in the table about the service requester information 1051B and the client terminal information 1051C do not take a fixed structure. Taking the service requester information as an example, the service requester information is classified into a common information item including a requester name and a sex and an expanded information having a different description therefrom, such as an age and a birth date, in which the same customizing information can be dynamically registered. The user of the server or the administrator of the service mediate server can add the expanded information item as a condition for retrieving the server. For this purpose, the table may employ the structure wherein the service requester ID is placed in a column, each information item is specified as one table element, and the table elements are connected as a list. In this case, each client may freely select any one of the information items of the target service requester information 1051B. Further, the user of the server or the administrator of the service mediate server enables to dynamically add the information item. This list structure is effective in managing information items such as an address and a communication type of each client terminal held by the service client terminal information 1051C.

By managing the customizing information for each above-indicated service requester in the client ID table 1051, it is possible to grasp a favor of the end user and a using history of the service for the purpose of selecting the service for meeting the request of each end user. The service mediate server makes it possible for the end user himself or herself to retrieve the service for meeting his or her favor and for the system itself to automatically hold and manage the using history of the service, thereby reducing the burden of the end user.

The requester information or the information item to be saved in the client terminal information is registered by the server or the administrator of the service mediate server. This is because the customizing information on which the service is provided is determined only from the service providing side. Further, each information item to be registered from each server 141 may be described in various manners. For example, in FIG. 3, a server may register an information item of an age, while another server may register a birth date. In order to absorb this kind of descriptive difference, it is considered to have an information item list table for uniquely identifying the information items of the customizing information within the side of the service mediate server or the system. In this information item list table, the common information item is set so that the server may uniquely identify the descriptions of the information items to be registered.

Each common information item is made to correspond to the information item described in another manner but having the identical content therewith. For example, in the case that the common item is an age, the birth date is made to correspond to the age in the table as another information item for the common item. The information item of the customizing information to be used in the client table 1051 may be selected only from the information items registered in the information item list table.

The customized information to be registered in the client ID table 1051 is registered at a time when the request from each client is received. For example, according to the first system, when the client 131 files an application for receiving a service provided by the service mediate server 100, the system is executed to select the customized information item to be registered for the client, prompt the end user to specify the content of the item, and register it in the table 1051. The information item to be registered depends on the favor of the end user. According to another system, the service request information 1051B may be dynamically registered. That is, the end user carries a medium for saving his or her own customized information such as an IC card and issues a request for a service with the customized information carried. At this time, the information about a service requester transmitted with the information is dynamically registered in the service requester client table. Based on the registered information, the process for retrieving the server is executed. This type of system is effective in constantly holding the information customized to each user on the side of the system and preventing the his or her privacy from being made open or a risk of being made open.

Figure 4:
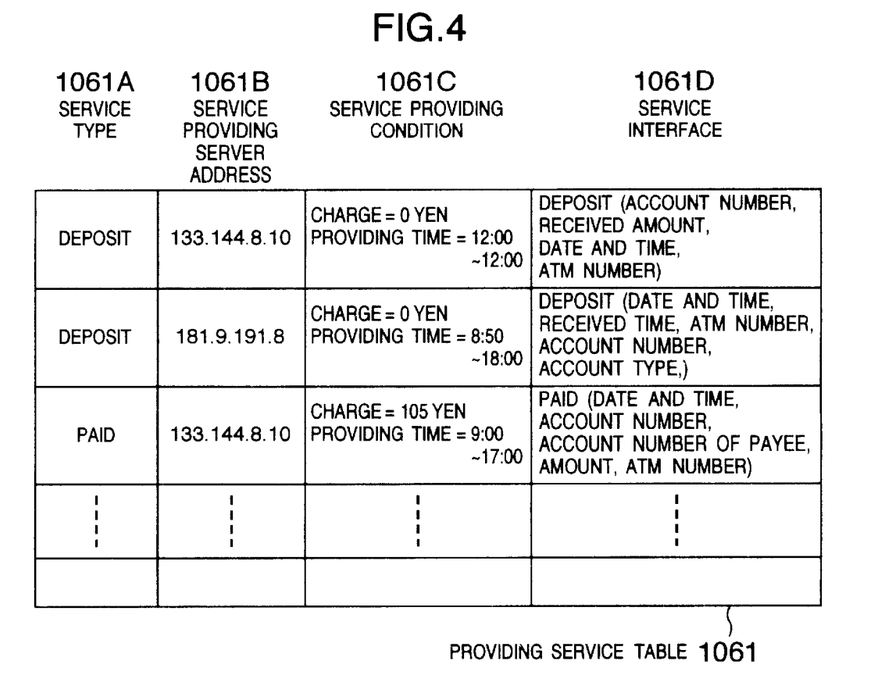
FIG. 4 is a view showing an example of a providing service table.

FIG. 4 shows an arrangement of the providing service database 106. The providing service database 106 holds the attribute information about a providing service such as the condition on which the service is provided. This table is made up of a service type 1061A for identifying the content of the service provided by the server, a server ID 1061B for indicating a logical location of the server, a service providing condition 1061C for saving the condition information for providing the service, and a service interface 1061D having a description of a list of the interface information required to be specified by the client. Like the client ID table 1051 mentioned above, the service providing condition 1061C and the service interface 1061D take the structure that each information item may be dynamically added. For example, the list structure of each service type is used. Further, about each information item, like the service requester information, the information item specified from each information providing service may be described in another manner. In such a case, the common information item is made to correspond to the information item described in its own manner by using the foregoing information item managing table.

According to the first system, the service item 1061A is defined as an ID to be uniquely identified for each server. In this case, the allocation of the ID is referred to the application running inside of the service providing server. In order to uniquely identify the service type, the ID is managed as paired with the server ID 1061B. According to the second system, the service types are uniquely managed by the service mediate server.

The service types to be provided are registered on the side of the service mediate server. Then, each service providing server operates to determine the service to be provided on the basis of the service type defined by each service providing server and request the service mediate server of the attribute information of the service to be provided for the purpose of retrieving the service.

The server ID 1061B is a logical identifier of the server that does not depend on the physical address of the communication medium. This identifier is uniquely identified inside the system. This method therefor is executed to uniquely manage the IDs through the service mediate server and allocate the IDs to the services provided through the service mediate server when the service providing server files an application for the service.

The service providing system 1061C uses the service type for the condition information specified by the retrieval process of the service mediate managing unit 102. The user of the server specifies the attribute information of the service to be provided under this condition. The attribute information describes the conditions of the service to be provided by the user of the server, including a fare, a providing time, a deposit place, a bank account, a list of bank accounts where his or her salary is to be paid, and so forth. Based on these conditions, the most approximate service type and server are retrieved in response to the request issued from a service requesting client.

The service interface 1061D saves parameter information to be specified when the client 131 requests the service. About the condition information on which the service type is retrieved and the information required when the service is provided after the retrieval, the information items are registered on this service interface from the server. By doing a process for retrieving the service through the service mediate managing unit by using this providing service table, the end user can make use of his or her target service without having to grasp the service contents and the connecting addresses of the massive number of servers.

The information items of the service providing condition 1061C take the structure where the change of the items and the addition of a new item are dynamically done. The information item can use the approximate service to the change of the status. That is, though many information provides are coming into the information service business and the services provided by the existing information providing computer are frequently changed, the end user can make use of the most approximate service to the time point if a good service is added without having to grasp all the changes.

The information items of the service interface 1061D takes the structure where the change of the items and the addition of a new item are dynamically done. This makes it easier to change the service for meeting the request for the end user according to the environment of the system and the quality of the information/service. By integrating the service interfaces of various types with each other and notifying the client of the information item at a normal time, it is possible to select the most approximate service condition to that time point. This results in making it easier for the end user to integrally evaluate the status and select the approximate service to the change.

Figure 5:
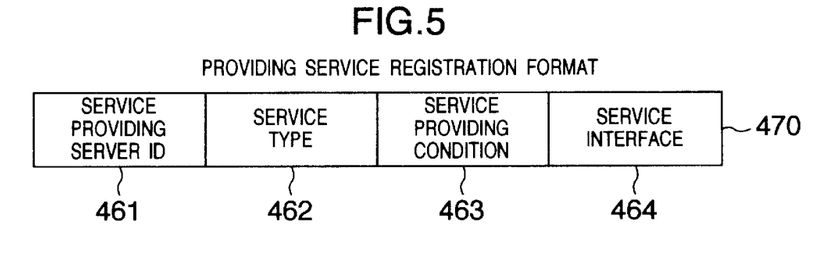
FIG. 5 is a view showing an example of a message for registering a providing service from a server to a service mediate server.

FIG. 5 illustrates a registration format of the services to be provided from the server 141 to the service mediate server 100. In the registration, the server needs to obtain the server ID of his or her own according to the foregoing system. This description is based on the assumption that the server ID is obtained.

The registering format is made up of a server ID 461, a service type ID 462 for indicating the content of the service to be provided, a service providing condition 463 for indicating the retrieval condition on the providing server side used by the process for retrieving the service, and a service interface 464 for indicating a type of parameter information about what kind of request condition is to be specified from the client if the service is provided. Each information item is described in the providing service table shown in FIG. 4. One or more services may be added to this format. The format shown in FIG. 5 is used for registering one service. Two or more formats may be connected when they are transmitted.

Figure 6:
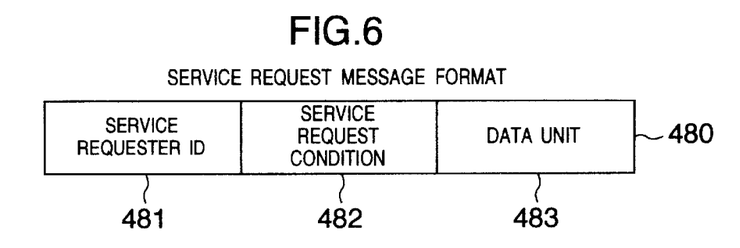
FIG. 6 is a view showing an example of a message format for requesting a service to be transferred from a client to a service mediate server.

FIG. 6 illustrates one example of a service request message format 480 used when a service is requested from the client to the service mediate server. As mentioned above, the service requester ID may be obtained by the client in advance. In place, herein, it is presupposed that the client obtains his or her own service requester ID. The message format is made up of a service requester ID 481 for uniquely identifying the client in the system, a service request condition 482 for specifying the condition information required for retrieval in the case of requesting the service, and a data unit 483. Herein, it is assumed that the service requester information shown in FIG. 3 is inputted to the data unit when it is transmitted. That is, where the service request information itself is registered in a portable medium such as an IC card, the service request information itself is inputted to the data unit 483 when it is transmitted. Where the service requester information is saved in the service mediate server and is used for the retrieval process, this data unit is not used the mediate server address is added to the service requester ID or contained in the ID.

In turn, the description will be oriented to the general process of the service mediate server 100 according to the first embodiment.

Figure 7:
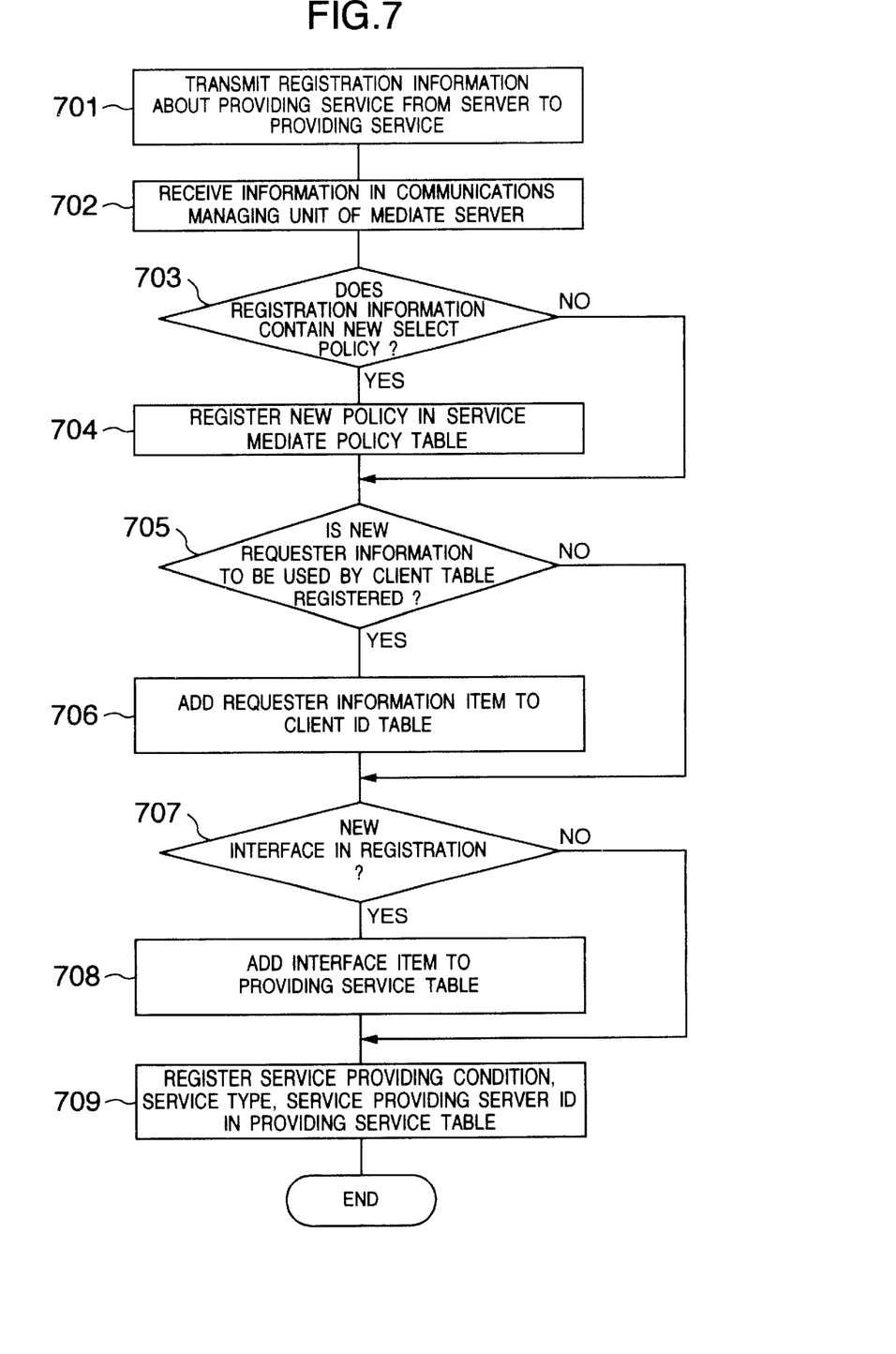
FIG. 7 is a flowchart showing a process of registering a providing service in a service mediate server.

FIG. 7 is a flowchart illustrating the process for registering a service from the server to the service mediate server. The registration information about the service provided by the server is received in the communications managing unit included in the service mediate server (701, 702). In receipt, the registration information is received through a format shown in FIG. 5. then, an operation is executed to retrieve a new select policy that is not registered in the service mediate policy database included in the mediate server (702). If any, the new select policy information is registered in the service mediate policy service. The addition of the policy is an optional function in registering the service. If the new policy cannot be found, this process is not required to be done. Next, the operation is executed to retrieve if a new kind of information item of requester information to be used is registered in a client ID table (705). If any information item is found, a new information item is added to an information item managing table included in the client ID table. Further, a new item is added to the items of the service requester information 1051B included in the client ID table (706). If no additional condition exists when adding a new service, this process 706 is not executed.

Next, an operation is executed to retrieve if a new service interface is registered in registration (707). If a new item to be specified when the end user requests a new service is necessary, the new item is added to an information item managing table of the service interface in the providing service table (708). If there exists no information item to be added, this process is not executed. Upon termination of the addition of the new information item, the service providing condition, the service type, and the server ID about the service to be registered are added to the providing service table 1061 (709). Herein, one service registering process is completed.

Figure 8:
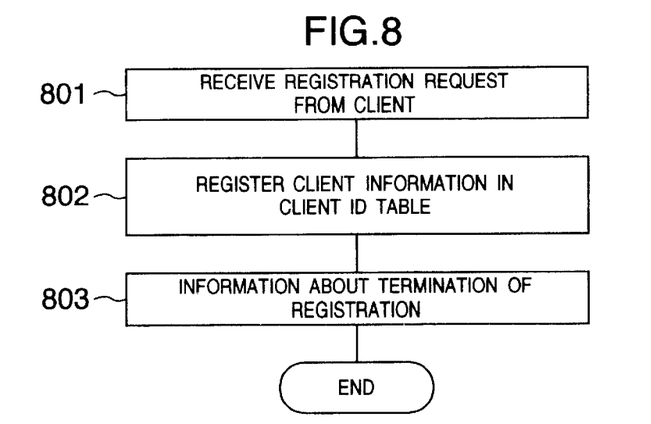
FIG. 8 is a flowchart showing a process of registering client information in a service mediate server.

FIG. 8 is a procedure to be executed in the case of adding one client to the service mediate server. The request for registration from a new client is received in the communications managing unit (801). Based on the received information, the client ID is allocated to the new client and the information of the client is registered in the client table (802). At this time, if the information about the client is held in the service mediate server, the information about the service requester is registered in the client ID table. However, if the information about the requester is carried with a portable medium, the requester information is not registered in the table. The termination of registration is transmitted to the client (803) and then the process is terminated.

Figure 9:
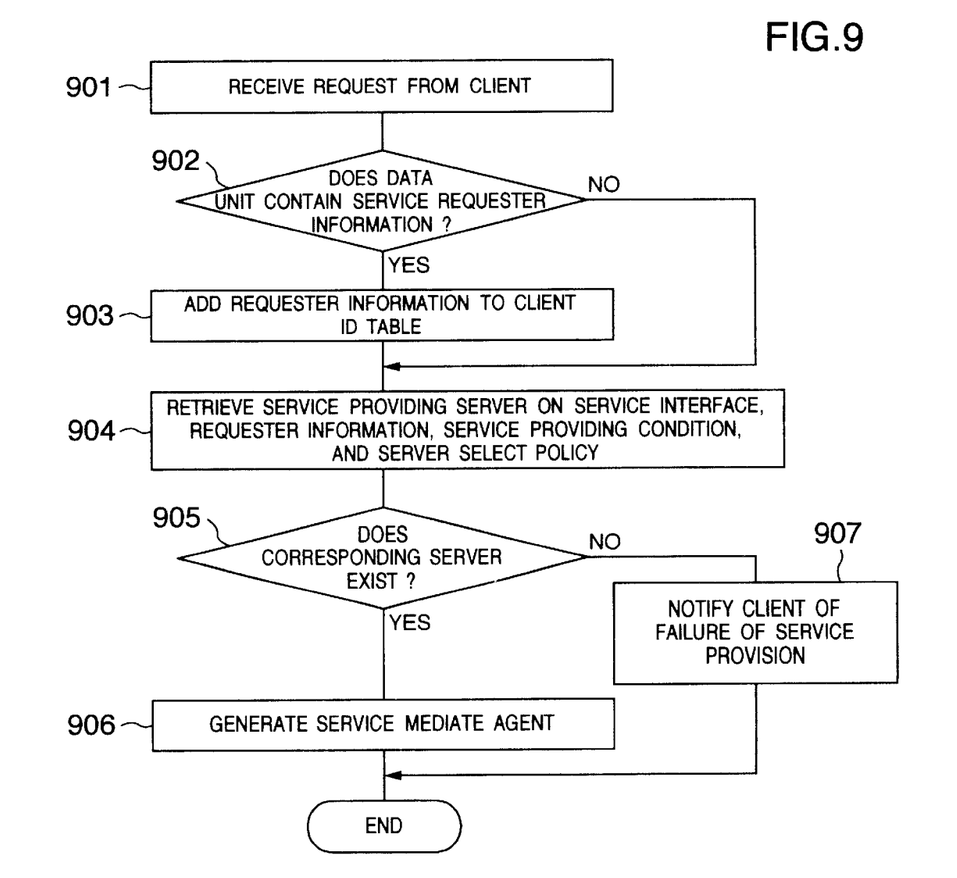
FIG. 9 is a flowchart showing a process of requesting a service from a client in a service mediate server.

FIG. 9 illustrates the process to be executed in receiving a request for a service from the client. A service request message is received in the communications managing unit (901). The message format is the same as shown in FIG. 6. An operation is executed to retrieve if the service requester information is held in the data unit by referring to the message format (902). At this time, if the service requester information is held in the data unit, for dynamically registering the service requester information, the service requester information located inside of the message format is saved in the corresponding area of the client ID table (903).

Next, the process for retrieving the service is executed in the service mediate managing unit by referring to the service requester information located inside of the client ID table 105, a request condition specified by the service interface inside of the providing service table 106, the providing condition of each service, and the server select policy information located inside of the service mediate policy database (904). After retrieval, if one or more relevant servers are found, the operation is executed to generate a service mediate agent for managing the process for providing the service corresponding to the service request (906). If no relevant server is found, the failure of providing the service is notified to the client (907). Herein, the process of the service mediate managing unit is terminated and then the receipt of the next service request is awaited.

Figure 10:
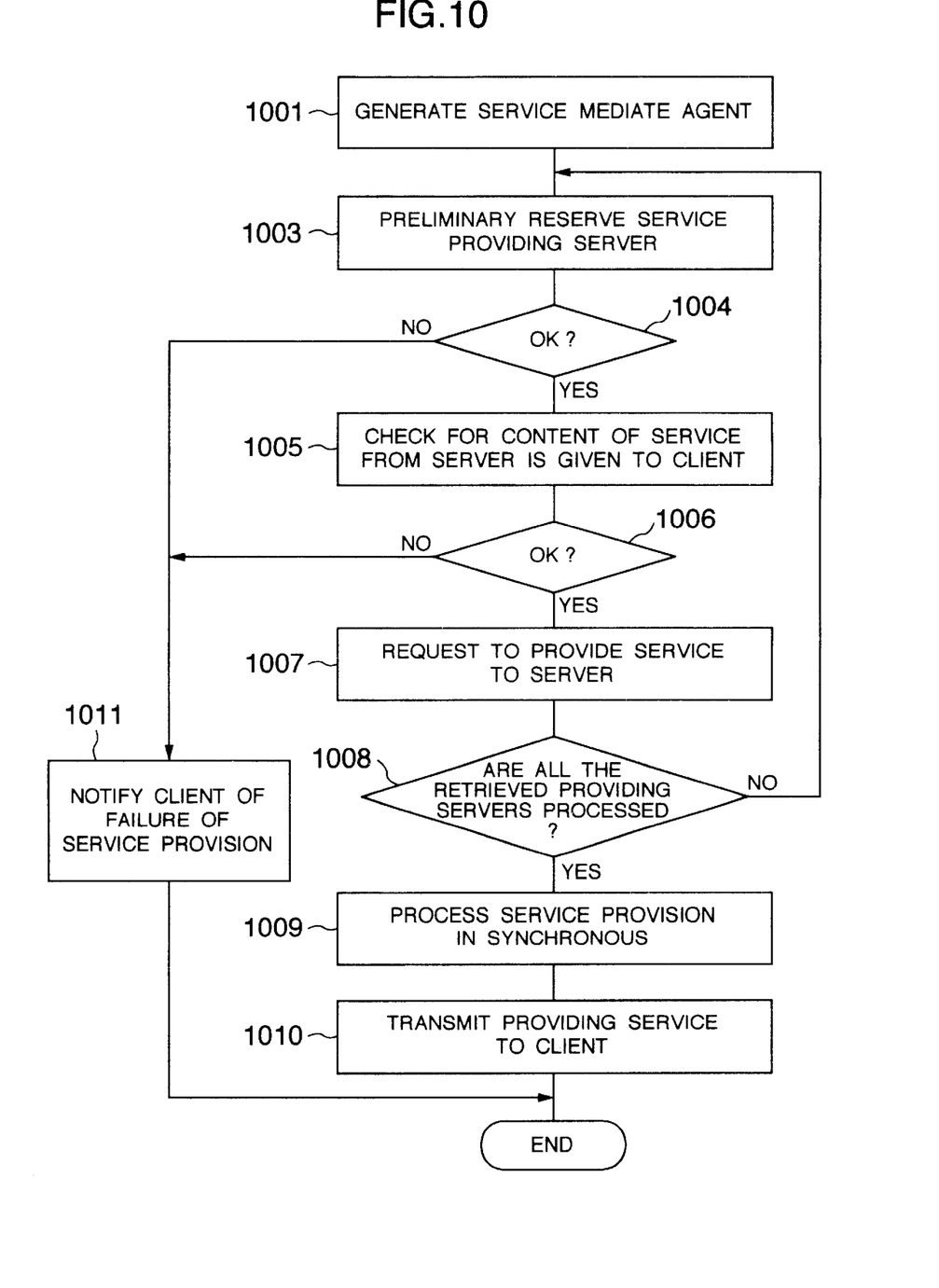
FIG. 10 is a flowchart showing a process of controlling distribution of a service to a service mediate agent in a service mediate server.

FIG. 10 is a flowchart showing a general process of the service mediate agent located in the service mediate server. If the service to be provided and the service providing server are retrieved by the service mediate managing unit, the service mediate agent is generated (1001). The provision of the service is preliminarily reserved in the providing server (1003). If the preparation for the provision of the server from the client is in the affirmative (1004), the operation is executed to inquire the client of the content of the service (1005). In this inquiry, if the content of the service can be checked on the side of the client, the service mediate managing unit requests the server of the provision of the server (1007). At this time, if no preliminary reservation is done or the requesting client rejects the content of the service to be provided, the failure of providing the service is transmitted to the client (1011). If the request of providing the service to the service providing server is transmitted to all the retrieved providing servers (1008), the synchronous process about the service provided from each server is executed (1009). Herein, the synchronous process means a process of integrating pieces of information from plural providing services, reserving the provision from the server at a designed time, temporarily storing the content of the service from the server, and supporting the relevant service process among the servers. When taking synchronicity with the providing service, the providing service is transmitted to the request client (1010) and the process of the service mediate agent is terminated.

The agent may be generated and terminated at each request for a service. Or, it may be generated and terminated for each client. In the latter case, the operation is executed to wait for the next request from the same client if the current process is executed.

Next, the description will be oriented to the second embodiment.

Figure 11:
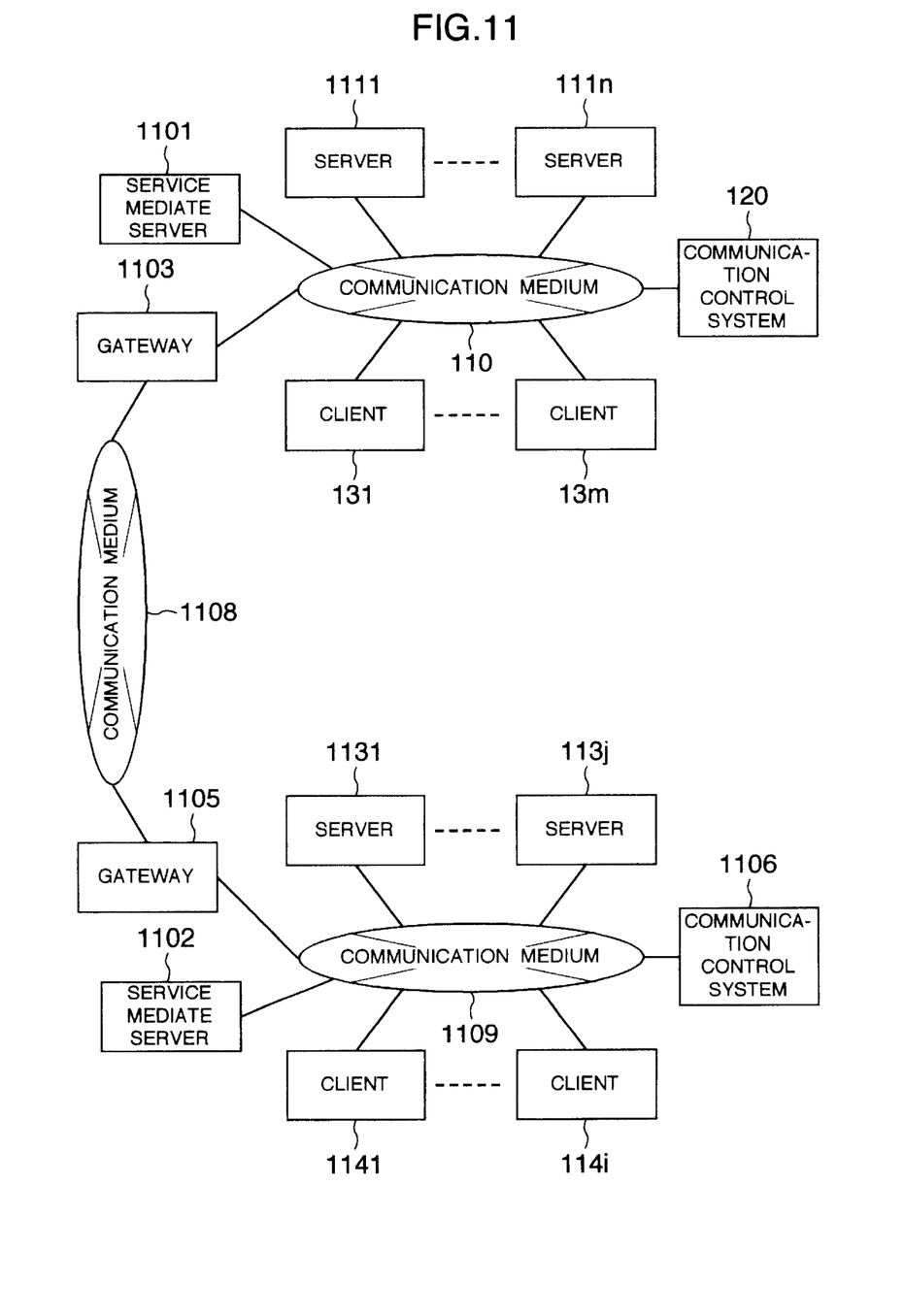
FIG. 11 is a diagram showing a system configuration according to a second embodiment of the present invention.

FIG. 11 shows a system configuration of the second embodiment. The system configuration shown herein is configured to have two system configurations as described in the first embodiment connected through a communication medium 1108 and gateways 1103 and 1105 respectively located in these configurations, that is, each of the system configurations having the clients, the servers, the service mediate server, the communications control system and the gateway. A communication medium 110 is communicable with a communication medium 1109 through gateways 1103 and 1105 and a communication medium 1108 located therebetween. All the informations about a request and a provision of a service cannot be communicated between different communication mediums in light of the communication performance of each communication medium. Hence, the service mediate server is located in each communication medium (1101, 1102). Instead, plural servers mediate servers 1101 may be connected to one communication medium so that those servers 1101 may be associated with each other.

The present embodiment concerns with a system for implementing a process of cooperating the service mediate servers and selecting the most approximate service from the server managed by each service mediate server, based on the request from the client managed by each service mediate server.

Each service mediate server, each client, and the internal arrangement of each server are likewise to those of the first embodiment, except that the database located in each service mediate server is shared among plural service mediate servers. The service mediate policy database 104, the client database 105, and the providing service database 106 are notified to another specific service mediate server located in the system in registering the informations of those databases. The term "specific" herein means the following three systems. In the first system, the registration information is flown from the client to all the service mediate servers located inside of the system. In this system, all the service mediate servers share the service information of all the servers located in the system. In the second system, the service mediate servers are divided into plural groups, so that the registration information about the service is flown from the client or the server to the service mediate servers located in each group.

At this time, the service information is shared in the group having the service mediate servers. In the third system, the specific service mediate servers to be cooperated with one another are predetermined and the service information is shared among those mediate servers.

According to the present embodiment, one service mediate server is located at each communication medium. The service mediate server 1102 has the clients 1141 to 1141 and the servers 1131 to 113*j* managed by the server itself. The service mediate server 1101 has the clients 131 to 13*m* and the servers 1111 to 111*n* managed by the server itself. As mentioned above, the information on the service mediate server 1102 is shared with the other service mediate server 1101. If a service request is received from the client 1141, the service mediate server 1102 operates to retrieve the service through the service mediate managing unit 102 located in the server 1102 itself, notify the service mediate managing unit located in the other service mediate server 1101 of the request condition, and then retrieve the service. If the most approximate service is found in the server 1101 as the retrieving result, the information is notified to the service mediate managing unit located in the service mediate server 1102. If the most approximate service is found out on the communication medium 1109 of the service mediate server 1102 as well as in the server 1111 managed by the other service mediate server 1101 on the other communication medium 110, the mediate managing unit operates to start the service mediate agent and execute control of providing the service.

According to the present embodiment, each service mediate server having the clients and the servers managed by the mediate server itself operates to share the information, retrieve the most approximate service to the request for the client, and provide the most approximate service. These service mediate servers make it possible to cope with increase of clients and servers in number or a wider system configuration, concretely, flexibly add a service to more servers, and easily retrieve and provide a service to more clients.

The structure of each table held in the service mediate managing unit follows that described about the first embodiment. Hence, it may flexibly correspond to dynamic attribute change.

In turn, the description will be oriented to which of the processes is used for the communication between the service mediate servers with reference to the flowchart of the first embodiment.

In FIG. 7, the process 704 for registering a new select policy to the service mediate policy table, the process 706 for newly adding an information item of the service requester information to the client ID table, the process 708 for newly adding a service interface item to the providing service table, and the process 709 for registering the attribute information about the providing service such as a service providing condition to the providing service table are executed to notify the service mediate managing unit located in the other service mediate server of the information relevant to those processes.

In FIG. 8, the process 802 for registering the service requester information to the client table is executed to notify the service mediate managing unit located in the other service mediate server of the registration information. In FIG. 9, the process 901 for receiving a request for a service and obtaining the condition information required for retrieval from the requested format and the process 902 for registering the service requester information to the client ID table are executed to notify the service mediate managing unit located in the other service mediate server of the requested information and the registration information. Further, the process 905 is executed to wait for the retrieval of the corresponding server and service. The process 906 is executed to generate the service mediate agent for providing and managing the services from the servers managed by its own service mediate server and the services from the servers managed by the other service mediate server. In FIG. 10, the processes 1003 and 1007 for giving a preliminary reservation to the providing servers are executed to make an inquiry to the corresponding servers through different communication mediums.

In turn, the description will be oriented to the third embodiment.

Figure 12:
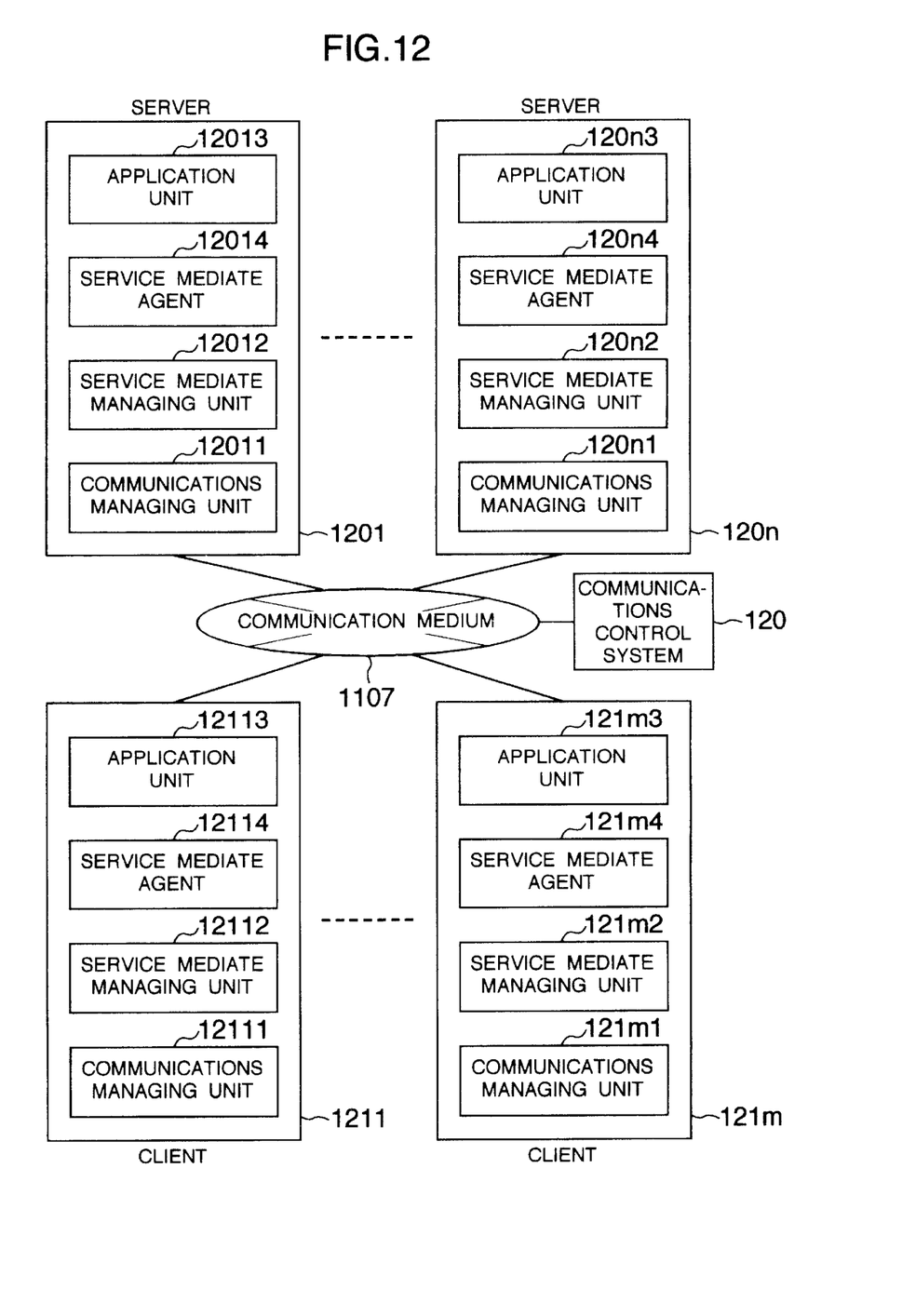
FIG. 12 is a diagram showing a system configuration according to a third embodiment of the present invention.

The system configuration of the third embodiment is illustrated in FIG. 12. Herein, the servers 1201 to 120*n* and the clients 1211 to 121*n* provide the function of the server mediate server. By the same processing system as that described about the second embodiment, each of the service mediate managing units 12012 to 120*n*2 and 12112 to 121*m*2 shares the information to be managed and retrieves and provides the most approximate service. According to this embodiment, the system configuration excludes a mediating computer referred to as a service mediate server. In place, the mediating function, that is, the service mediate managing unit and the service mediate agent function are distributed to each server or client. This is effective in continuing the process of retrieving and providing the service through the use of another mediating function if fault takes place in the mediating function of one server or client. FIG. 12 illustrates the system configuration wherein all the servers and the clients have the mediating function. In place, the other system may be configured so that only the specific servers and clients determined by the specific ground have the mediating function. This system configuration may realize the foregoing effect.

In turn, the description will be oriented to the system configuration according to the fourth embodiment.

Figure 13:
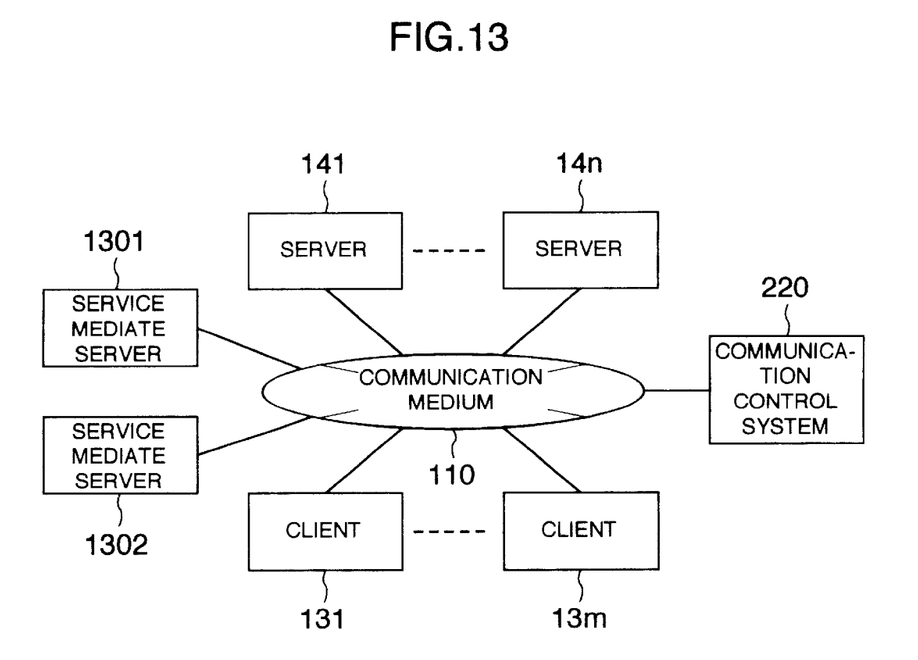
FIG. 13 is a diagram showing a system configuration according to a fourth embodiment of the present invention.

The general system configuration of the fourth embodiment is illustrated in FIG. 13. The system is configured so that plural clients 131 to 13*m* and plural servers 141 to 14*n* are connected to one communication medium and plural service mediate servers 1301 and 1302 are located between the clients and the servers and in connection with the communication medium. The communications control through the communication medium is managed by the communications control system 120. At this time, each of the service mediate servers 1301 and 1302 has the function of managing both the client and the server. This makes it possible to distribute the load burdened on the mediating process to another mediate server 1301 if the high processing load of the mediate server 1302 is received. If fault takes place in any one of the mediate servers, another mediate server may be replaced with the failed mediate server for the purpose of deputizing the service request after the fault. These series of processes are executed on the presumption that the attribute information of the clients and the servers are shared by the service mediate servers 1301 and 1302 as indicated about the second embodiment. FIG. 13 exemplarily illustrates the association between the two service mediate servers. In place, the system may be configured so that the coordination is executed among three service mediate servers located in a distributed manner. This system makes it possible to do a mediating process between the client and the server as well.

What is claimed is:

1. A service providing system comprising:
   a plurality of first devices for obtaining information;

a plurality of second devices for providing information connected through a network; and a mediating device mediated between said plurality of first devices for obtaining information and said plurality of second devices for providing information, said mediating device serving to receive a content requested by one of said first devices for obtaining information, determining at least one of said second devices to which said information is to be sent based on given information among said first devices and said second devices, transmit a request for providing information to at least one of said second devices for providing information, based on said requested content, obtain the requested information, and control the distribution of information to said one first device for obtaining information, wherein said mediating device serves to receive and store attribute information provided by at least one of said second devices for providing information, and further searching at least one of said second devices based on said attribute information associated with each second device, for customized information about said first devices, and content requested by said one of said first devices, wherein said mediating device serves to receive and store retrieval policy information provided by at least one of said second devices for providing information, and further searching at least one of said second devices for providing information based on said retrieval policy information, wherein said mediating device includes a communications managing unit, a service mediate managing unit, at least one service mediate agent, and said communications managing unit serves to receive a content requested by said one of said first devices for obtaining information, register attribute information of the information provided from said plurality of second devices for providing information, managing a communicating process in the case of the process for providing information, said service mediate managing unit serves to search said plurality of second devices for providing information on the basis of at least one of customized information about said one of said first devices for obtaining information, attribute information about said plurality of second devices for providing information, and mediate policy information for searching said plurality of second devices for providing information, and said service mediate agent serves to control distribution of information to said one of said first devices for obtaining information by selecting and starting an application program in said searched second device for providing information, passing a proper value to said application program and obtaining the content of information provided by said application program.

* * * * *